United States Patent [19]

Terawaki et al.

[11] Patent Number: 5,624,588
[45] Date of Patent: Apr. 29, 1997

[54] METHOD OF CONTROLLING ROBOT FOR USE IN ARC WELDING

[75] Inventors: Fumikazu Terawaki; Yoshitaka Ikeda, both of Yamanashi, Japan

[73] Assignee: Fanuc Ltd., Yamanashi, Japan

[21] Appl. No.: 515,989

[22] Filed: Aug. 17, 1995

[30] Foreign Application Priority Data

Aug. 22, 1994 [JP] Japan .................................. 6-220999

[51] Int. Cl.⁶ ...................................................... B23K 9/127
[52] U.S. Cl. ................................ 219/124.34; 219/125.11; 901/42
[58] Field of Search ........................ 219/124.34, 125.11; 901/42

[56] References Cited

U.S. PATENT DOCUMENTS

| | | | |
|---|---|---|---|
| 4,014,495 | 3/1977 | Oda et al. ................................ | 901/42 |
| 4,508,953 | 4/1985 | Murakami et al. ...................... | 901/42 |
| 5,399,870 | 3/1995 | Torii et al. . | |
| 5,465,037 | 11/1995 | Huissoon et al. ...................... | 219/124.34 |

FOREIGN PATENT DOCUMENTS 4-190977  7/1992  Japan .

*Primary Examiner*—Clifford C. Sims
*Attorney, Agent, or Firm*—Staas & Halsey

[57] ABSTRACT

A robot supports a welding torch for use in arc welding of a cylindrical welding object. The welding object is rotated about an axis and is controlled by a robot controller. The robot is operated to track the welding torch along a calculated welding line to continuously position the welding torch along the welding line. A reference circle is formed by rotation of one point on the welding object. A coordinate system is set with a center corresponding to the center of the reference circle. A laser sensor detects a point on the welding line, and the detected point is stored by using a distance r from a center O of the work coordinate system and a z-coordinate value z. As the cylindrical welding object is rotated by an angle θ corresponding to an interval between the position detected by the laser sensor and a calculated second position, the welding torch is moved to a position to coincide with the second position.

6 Claims, 6 Drawing Sheets

F I G. 3
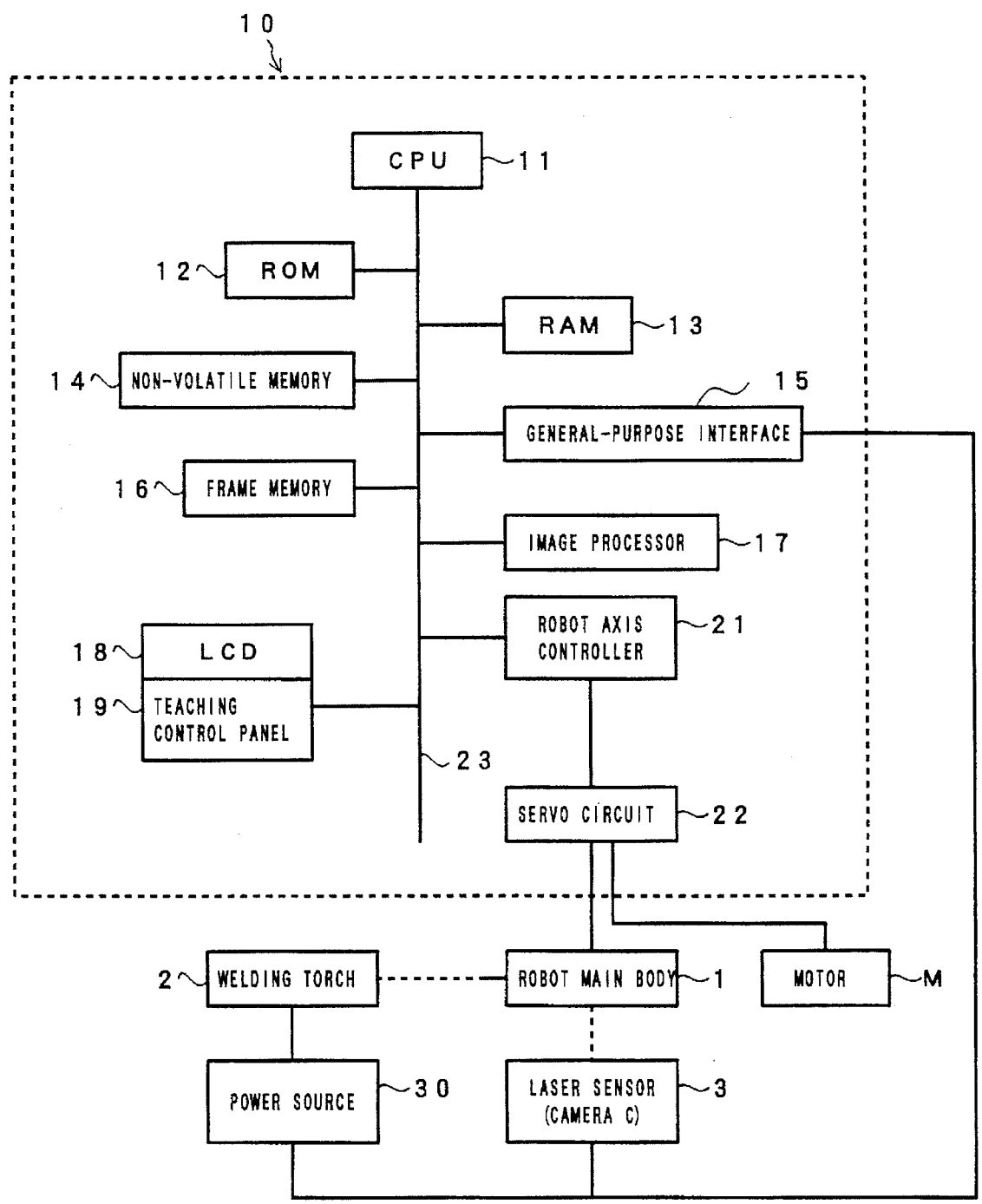

FIG. 6

| AREA NUMBER | z-COORDINATE VALUE ON WORK COORDINATE SYSTEM Σ1 | DISTANCE r BETWEEN DETECTED POSITION 7 AND ORIGIN O |
|---|---|---|
| 1 | $z_1$ | $r_1$ |
| 2 | $z_2$ | $r_2$ |
| 3 | $z_3$ | $r_3$ |
| ⋮ | ⋮ | ⋮ |
| n−1 | $z_{n-1}$ | $r_{n-1}$ |
| n | $z_n$ | $r_n$ |

METHOD OF CONTROLLING ROBOT FOR USE IN ARC WELDING

BACKGROUND OF THE INVENTION

1. Field of the Invention

This invention relates to a method of controlling a robot, in which a tracking motion by the robot is carried out to continuously position a torch distal end on a welding line during welding operation in case a welding torch is supported by the industrial robot, a welding object is rotated by an additional axis of a robot controller, and arc welding is made without moving the torch distal end in a direction along the welding line.

2. Description of the Related Art

There has been employed a robot tracking method in which a laser sensor is used to sense an area on the front side of a torch distal end of a robot, so as to repeatedly find the next target position on a welding line on a short cycle. The torch distal end is then sequentially moved toward the next welding target positions on the welding line.

However, in prior art method, the torch distal end is moved to the next target position along the welding line. Thus, the method can not be applied to welding in a mode where a cylindrical welding object is rotated while fixing the torch distal end (i.e., while preventing the torch distal end from moving in a direction along the welding line).

OBJECTS AND SUMMARY OF THE INVENTION

It is an object of the present invention to provide a method of controlling a robot in which a welding line tracking motion is enabled in welding of a type which executes welding by rotating a cylindrical welding object (hereinafter referred to as workpiece) without moving a welding torch distal end supported by a robot in a direction along the welding line, thereby enhancing welding accuracy in welding operation.

A description will now be given of schematic tracking control of the present invention with reference to FIG. 4. A circle CR described by one optional point on a welding line on the cylindrical workpiece W and according to rotation of the workpiece W is initially found. Further, an orthogonal three x-y-z axes work coordinate system is set to have a center O of the circle CR as the origin and a plane including the circle CR as an x-y plane.

Then, a laser sensor is used to detect a point 7 on the welding line, and the detected point 7 is stored by using a distance r from the center O of the work coordinate system and a z-coordinate value z. Further, when it is judged that the detected point 7 reaches a position of a welding torch distal end point 4 according to rotation of the workpiece W, the welding torch distal end is moved to a position obtained by rotating the detected point 7 defined by the stored values of r and z about the coordinate origin O by an angle θ.

According to the above steps, it is possible to completely realize a tracking motion of the welding line even in a case of welding which prevents a tool center point from moving along the welding line.

BRIEF DESCRIPTION OF THE DRAWINGS

The foregoing and other objects and features of the invention will become apparent from the following description of preferred embodiments of the invention with reference to the accompanying drawings, in which:

FIG. 3 is a block diagram showing component parts forming a robot controller to execute the method of controlling the robot of the present invention;

FIG. 6 is a diagram illustrating a storage format when detection data of one position on the welding line, detected by a laser sensor, is stored in a buffer memory.

DETAILED DESCRIPTION OF THE PREFERRED EMBODIMENTS

Figure 1:
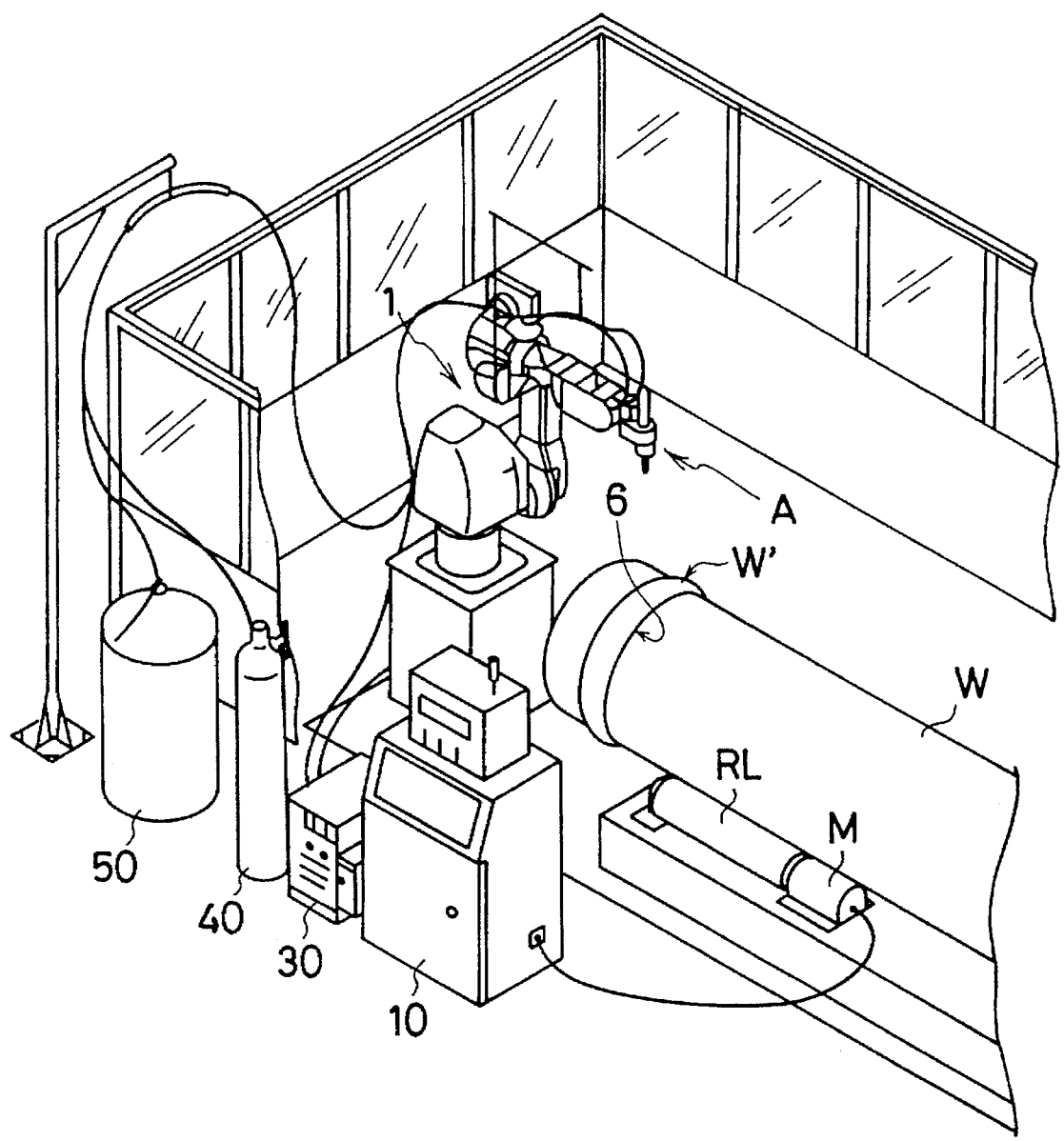
FIG. 1 is a perspective view showing one illustrative arrangement of component parts in a plant for use in welding operation according to a method of controlling a robot of the present invention.

FIG. 1 is a diagram showing one illustrative arrangement in a plant for use in welding operation in case arc welding operation is executed according to a method of controlling a robot of the present invention. In FIG. 1, a workpiece W serving as a welding object has a cylindrical form, and is mounted on a roller RL rotated by a motor M. The motor M is connected to a robot controller 10, and is controlled as an additional axis of the robot controller 10.

A ring-type member W' is fitted to one end of the workpiece W, and a boundary between the workpiece W and the ring-type member W' is defined as a welding line 6. That is, welding is made along the welding line, thereby welding and securing the ring-type member W' to an outer periphery of the workpiece W.

A robot 1 is disposed at a position to allow easy access to one point on the welding line 6. The robot 1 is connected to the robot controller 10 to control the operation of the robot 1. As will be described infra, a welding torch and a laser sensor are mounted to an arm distal end A of the robot 1.

A power source 30 supplies the welding torch with voltage and current for welding. Further, a bomb 40 supplies welding gas, and a welding wire container 50 supplies welding wire. The robot controller 10 is also connected to the power source 30 so as to control voltage supply and current supply from the power source 30 to the welding torch.

Figure 2:
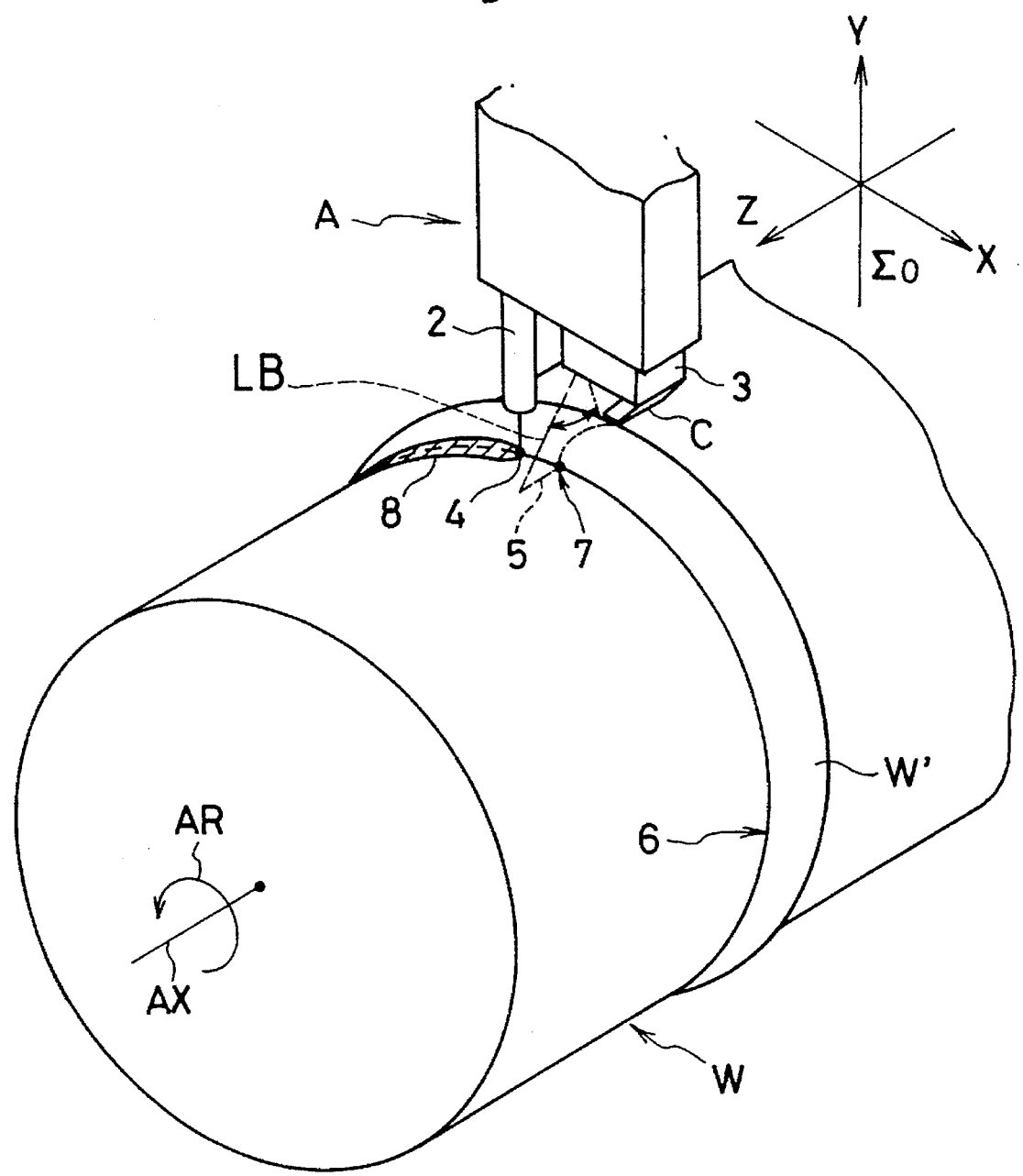
FIG. 2 is an enlarged diagram showing, in particular, a welding torch and an area in the vicinity of the welding torch in the component parts shown in FIG. 1.

FIG. 2 is an enlarged diagram showing the arm distal end A of the robot 1 shown in FIG. 1 together with an area in the vicinity of the welding line of the workpiece W, for illustrating a state in which the welding operation is executed by the robot 1. In FIG. 2, the workpiece W is rotated about a rotation axis AX in a direction of an arrow AR. On the other hand, the robot arm distal end A is provided with the welding torch 2 and the laser sensor 3 through an appropriate mounting mechanism. Reference numeral 4 designates a position of the welding torch distal end (hereinafter also referred to as welding point), which is set as a tool center point of the welding robot.

The laser sensor 3 emits a scanning beam LB to an area which is slightly forward spaced from the welding point 4 (i.e., a point which is slightly advanced toward a portion requiring welding from the welded point). As a result, an optical point locus 5 is formed in a direction perpendicular to the welding line 6 on the workpieces W and W'. Reference numeral 8 designates a weld bead which has been formed.

The laser sensor 3 is provided with a CCD camera C to photograph the optical point locus 5 diagonally with respect to a scanning plane (a sector-type plane) of a laser beam LB. The optical point locus 5 photographed by the camera C is analyzed in an image processor as will be described infra according to a well-known method. Consequently, a position of a bent point 7 of the optical point locus 5 can be detected as one point on the welding line 6.

Further, a world coordinate system $\Sigma 0$ is set in the robot 1. In the embodiment, a tangential direction of the welding line 6 at the taught welding point 4 is defined as the x-axis, a radial direction of the workpiece W at the same taught welding point 4 is defined as the y-axis, and a direction of a rotation axis AX is defined as the z-axis. Further, it is regarded that the world coordinate system $\Sigma 0$ is set to include the orthogonal three axes. A scanning direction of the laser beam LB is parallel to the z-axis. Further, during the welding operation, the welding torch 2 is appropriately inclined with respect to the x-axis, the y-axis, and the z-axis according to an attitude of the robot specified by an operation program.

Referring now to a block diagram of FIG. 3, a description will be given of the robot controller 10 to execute the method of controlling the robot of the present invention.

The robot controller 10 has the function of controlling the welding robot 1, and the function of processing an image recognized by the laser sensor 3. The robot controller 10 is provided with a central processing unit (hereinafter referred to as CPU) 11. The CPU 11 is connected, through a bus 23, to a memory 12 including a ROM, a memory 13 including a RAM, a non-volatile memory 14, a general-purpose interface 15 connected to the laser sensor 3 having the CCD camera C and the power source 30 for use in the welding torch, a frame memory 16, an image processor 17, a teaching console panel 19 having a liquid crystal display (LCD) 18, and a robot axis controller 21 which is connected to a robot main body 1 and the motor M (see FIG. 1) controlled as the additional axis through a servo circuit 22.

The laser sensor 3 is provided with a laser beam emitting portion and the CCD camera C, and scans by the laser beam LB and photographs the optical point locus in response to commands from the CPU 11. A signal of the image caught by the CCD camera is stored in the frame memory 16 through the general-purpose interface 15. Image information read out from the frame memory 16 is processed by the image processor 17 to find the position of the point 7 (see FIG. 2) at which the laser beam LB crosses the welding line 6.

The power source 30 has the function of controlling welding voltage and welding current which are supplied to the welding torch in response to a command from the CPU 11. The ROM 12 contains various programs required for the CPU 11 to control the robot main body 1, the laser sensor 3, the power source 30, and the robot controller 10 itself. The programs include a program to cause the CPU 11 to execute various processing (whose steps will be described infra) required to carry out the present invention.

The RAM 13 is a memory which can be used for temporary storage and arithmetic operation of data. Further, the non-volatile memory 14 contains various programs and parameter setting values which determine the steps of the operation of a robot system. Further, in the non-volatile memory 14, a buffer area is set to store data of the position of the successively detected point 7 in a mode as will be described infra.

Figure 4:
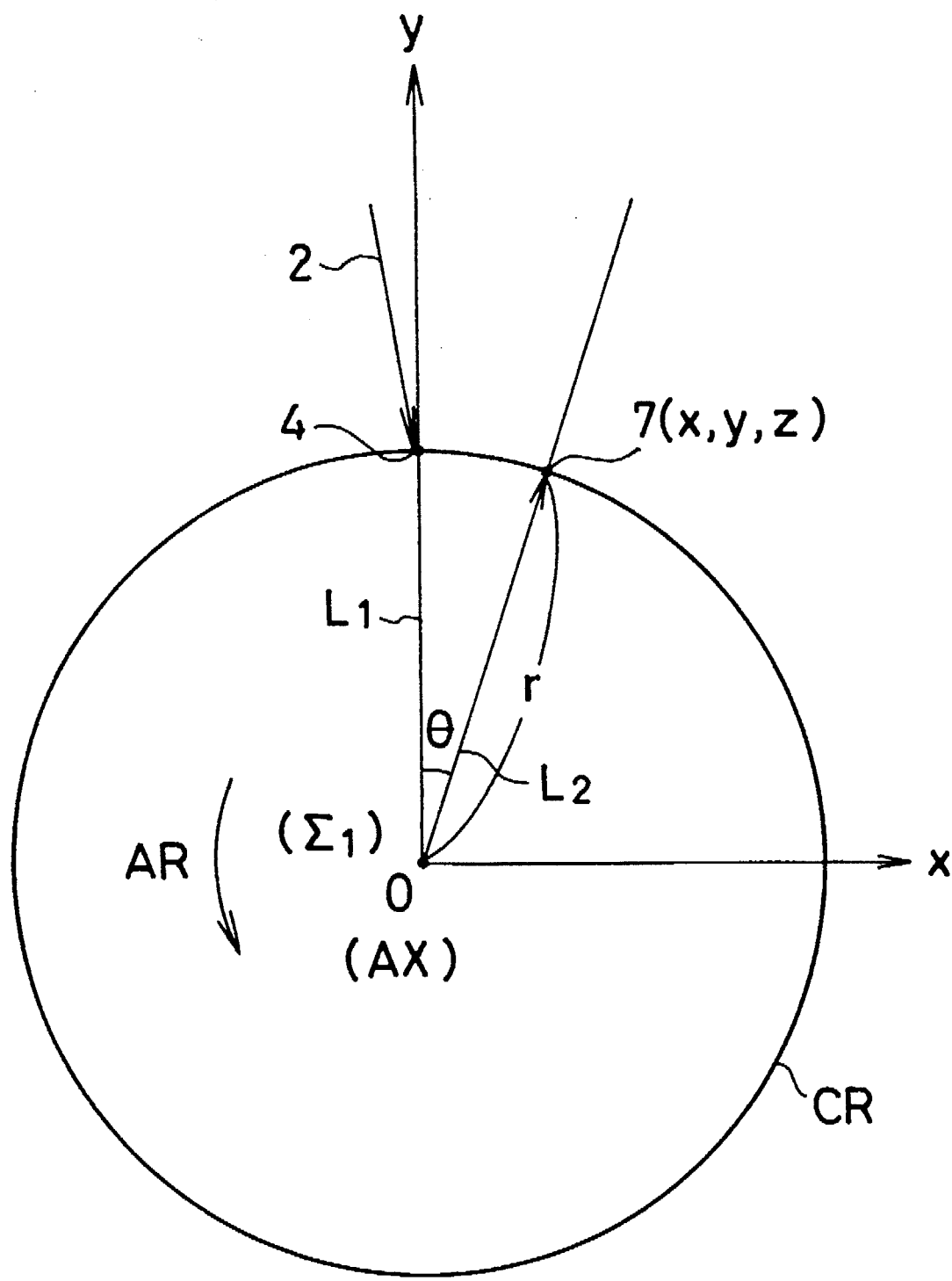
FIG. 4 is a diagram illustrating a reference circle which is set in a step precedent to a step of executing tracking motion of a welding line according to the method of the present invention.
Figure 5:
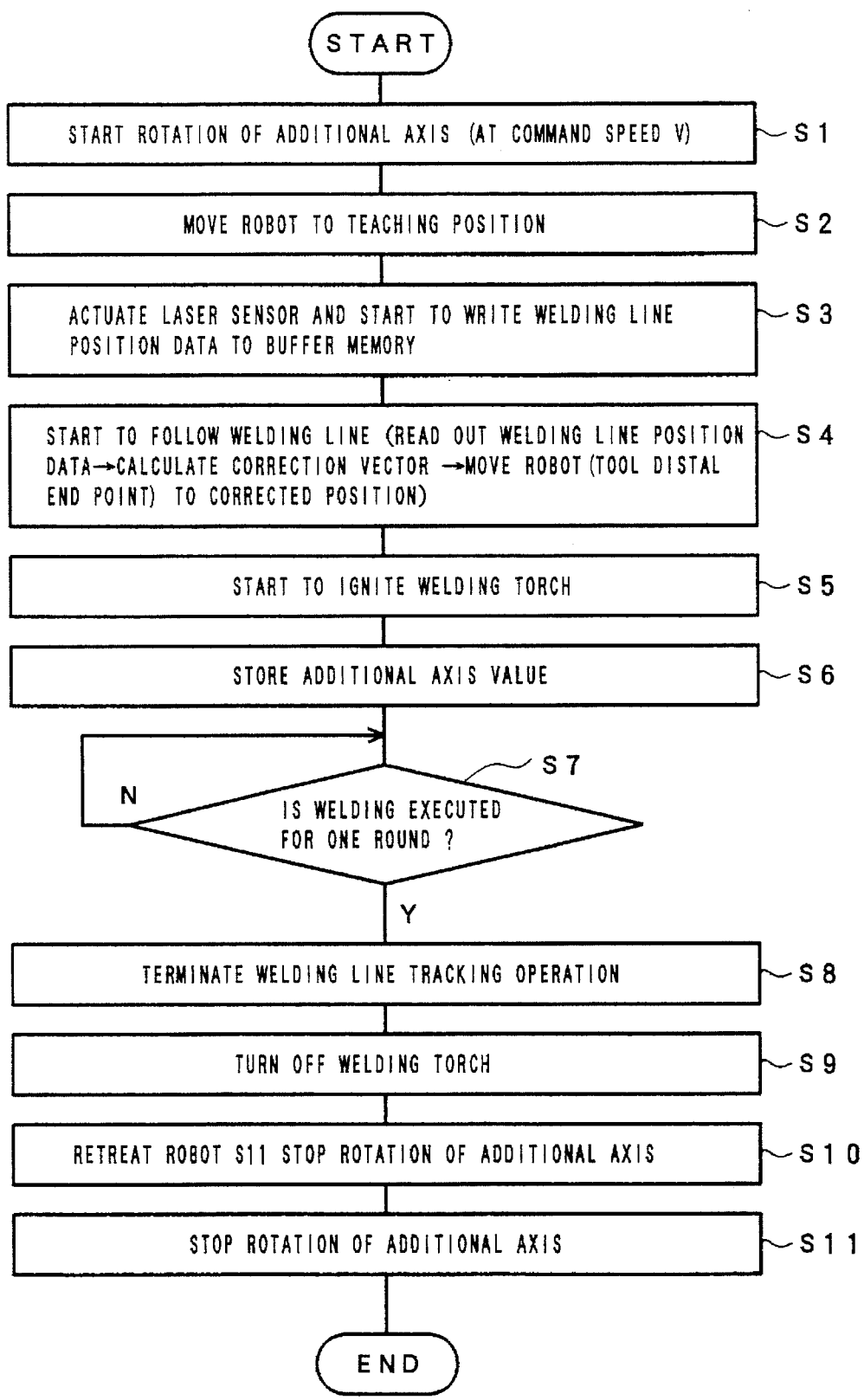
FIG. 5 is a flowchart illustrating steps of carrying out one embodiment of the method of the present invention.

Referring now to FIGS. 4 to 6, a description will be given of a steps of carrying out the method of the present invention by using the robot controller as set forth above.

Initially, before the welding operation is started, works are made according to the following steps (1) to (3), so as to set a reference circle which is described by the one point on the welding line of the workpiece W according to rotation of the additional axis (the motor M), and to set a coordinate system (a work coordinate system) with a center of the reference circle as the origin.

Step (1): the tool center point of the robot is successively moved to three points on the welding line 6, which lie at different additional axis positions from one another, to respectively obtain a world coordinate value of each of those three points. Then, obtained position data ([X1, Y1, Z1], [X2, Y2, Z2], [X3, Y3, Z3]) are stored in the non-volatile memory 14;

Step (2): the CPU 11 calculates to find one circle CR (hereinafter referred to as reference circle) passing through points shown by the three coordinate value data ([X1, Y1, Z1], [X2, Y2, Z2], [X3, Y3, Z3]); and Step (3): an orthogonal three x-y-z axes work coordinate system $\Sigma 1$ is set in the robot controller 10 to have a center position O [X0, Y0, Z0] of the found reference circle CR at the origin, and a plane including the reference circle CR as the x-y plane. In this case, directions of the x-axis and y-axis are set in parallel to directions of the X-axis and Y-axis of the world coordinate system $\Sigma 0$. Data representing a relationship between a position of the work coordinate system $\Sigma 1$ and an attitude is stored in an area of the non-volatile memory 14 for storage of coordinate system setting data.

It can be expected theoretically that the origin of the reference circle CR set in the above manner can be positioned on the rotation axis AX of the workpiece W.

Next, a description will now be given of the step of tracking the welding line with reference to a flowchart of FIG. 5.

Initially, one block of the operation program is read in order to start to rotate the additional axis at a command speed V which is specified by the operation program (Step S1). Subsequently, the next one block of the operation program is read to move the robot to a Leaching position (Step S2). Thereby, the tool center point reaches substantially on the welding line 6. In order to avoid an accidental interference, the teaching point is preferably set at a point slightly spaced from the welding line 6 in the radial direction of the workpiece W (i.e., in the y-axis direction).

Then, the laser sensor 3 is actuated to start to detect the position of the detected point 7 (see FIGS. 2 and 4), and to write detected point data to the buffer (Step S3). A format of the detected point data written to the buffer is shown in a table of FIG. 6. As seen from the table, a predetermined (i.e., the i-th) buffer area for each detection cycle contains a z-coordinate value $z_i$ on the work coordinate system $\Sigma 1$, and a distance $r_i$ between the detected point 7 and the origin O of the work coordinate system $\Sigma 1$ (i=1, 2, ... n).

Subsequently, the robot is started to track the welding line (Step S4). That is, the detected point 7 detected by the laser sensor is advanced from a sensor detecting position according to the rotation of the additional axis (i.e., rotation of the workpiece). Further, immediately before the detected point 7 reaches the position of the welding point 4, data $z_j$ and $r_j$ having the buffer area number j corresponding to the detected point 7 are read out. Then, the read-out data are used to find a moving target point of the tool center point.

As shown in FIG. 4, the detected point 7 can reach the position of the welding point 4 when the workpiece W is rotated by an angle θ after the detected point 7 is detected. Specifically, the detected point 7 can reach the position of the welding point 4 when an incremental quantity of an axis value reaches a quantity corresponding to the rotation of the workpiece W by the angle θ on the basis of the axis value of the additional axis and at a time when the position of the detected point 7 is detected. Here, the angle θ can be calculated depending upon a line L1 for connecting the origin position O (which has been set) of the work coordinate system Σ 1 and the position (which can be found by robot current position data) of the tool center point 4 at a time of detection of the detected point 7, and upon a line L2 for connecting the origin position O of the work coordinate system Σ 1 and the position (stored in the buffer) at the time of detection of the detected point 7.

Further, as shown in FIG. 4, the detected point 7 with a radius of rj and a z-value of zj in the work coordinate system Σ 1 is rotated by θ about the origin O of the work coordinate system Σ 1 in a counterclockwise direction (i.e., in the direction AR), resulting in a moving target position. Therefore, during execution of the tracking motion, a tool distal end point moves to zj in a direction of the z-axis of the work coordinate system 1, and moves to a position spaced from the coordinate origin O by rj on the x-y plane.

After the welding line tracking motion of the robot is started as described above, in the operation program, a block having the step of igniting the welding torch 2 is read to execute the step in the block (Step S5). Thereby, the welding operation can be executed while a distal end of the welding torch 2 tracks the welding line 6. Further, when the welding torch 2 is ignited, an additional axis value at the time is immediately stored as a reference value (Step S6).

In subsequent processing, the incremental quantity of additional axis value is checked on a short cycle on the basis of the reference additional axis value (Step S7). In case of welding executed for one round on the outer periphery of the workpiece W (i.e., in case of single-layer welding), when the additional axis value is increased to reach a value corresponding to 360 degrees-rotation of the workpiece W, the welding line tracking motion may be terminated (Step S8). Further, the welding torch 2 may be immediately turned off (Step S9), and the robot may be retreated (Step S10).

Finally, the additional axis is stopped to complete the processing.

In the embodiment, a description has been given of a case where welding is executed over the entire periphery of the cylindrical workpiece W. However, it is to be noted that the workpiece W may not be necessarily cylindrical, and the present invention can be applied to any welding line as long as the welding line portion has a shape of circular arc with a rotation axis of a workpiece at a center.

What is claimed is:

1. A method for controlling a welding robot system including an industrial robot, a robot controller which outputs control signals to control the robot, a welding torch supported by a distal end of the robot, cylindrical welding object rotating means driven in response to the control signals of said robot controller, and a laser sensor to detect a welding line on said welding object, said method comprising the steps of:

(a) rotating a first point on the welding line of said cylindrical welding object in response to control signals from said robot controller and at a predetermined angular velocity to form a reference circle having a center position, and determining a position of said welding torch with respect to the center position;

(b) detecting a second point on said welding line with said laser sensor during rotation of said welding object and calculating position data which corresponds to the second point;

(c) calculating a time when said second point will reach the position of said welding torch from the angular velocity of the welding object and the calculated position data of the second point;

(d) calculating a future position of said second point during rotation about the center position of said reference circle; and (e) moving the welding torch to the calculated future position at the calculated time, thereby executing welding line tracking of said robot.

2. A method of controlling a robot according to claim 1, wherein the center position of the circle in the step (a) is set as a coordinate origin of an orthogonal three axes coordinate system including said circle as a plane along a first-axis and a second-axis.

3. A method of controlling a robot according to claim 2, wherein the position data of the second point includes a distance measurement from the origin of said orthogonal three axes coordinate system to the detected point, and a third-axis value from the detected point.

4. A method for controlling a welding robot system including an industrial robot, a robot controller which outputs control signals to control the robot, a welding torch supported by a distal end of the robot, a roller which rotates the cylindrical welding object in response to the control signals of said robot controller, and a laser sensor which detects a welding line on the welding object, said method comprising the steps of:

rotating a first point on the welding line of said cylindrical welding object in response to control signals from the robot controller at a predetermined angular velocity to form a reference circle having a center position and determining a position of said welding torch with respect to the center position;

detecting a second point on said welding line with said laser sensor during rotation of said welding object and calculating position data corresponding to the second point;

calculating a time when said second point will reach the position of said welding torch from the angular velocity of the welding object and the calculated position data of the second point;

calculating a future position of said second point during rotation about the center position of said reference circle; and moving the welding torch to the calculated future position at the calculated time.

5. A method for controlling a robot arm which performs arc welding with a robot controller, comprising the steps of:

(a) (a-1) positioning a cylindrical object for rotation about a rotating axis,
    laying a robot tool center point on a first specific point of said object, and
    obtaining coordinate value data corresponding to said first specific point on a world coordinate system,
    (a-2) repeating sub step (a-1) to obtain coordinate value data of second and third specific points on the world coordinate system,
    (a-3) creating an equation which represents a reference circle passing through each of the first, second, and third specific points;

(b) setting a work coordinate system in the robot controller in which first and second orthogonal axes lie on a plane of said reference circle and a third axis extends perpendicularly through the center of the circle to define an origin;

(c) storing position data of the specific points in the robot controller on the work coordinate system which corresponds to a value of the rotating axis at a predetermined period, by using a laser sensor attached to a distal end of a robot arm, while rotating the object about the rotating axis at a predetermined speed;

(d) obtaining a detected position on the work coordinate system of a welding point to be welded by said laser sensor based on the position data stored in said step (c);

(e) calculating an incremental amount of rotation about the rotating axis which is required for said welding point to reach a distal end of a welding torch, based on the obtained position data, the position of the distal end of the welding torch, and the point of the origin of the work coordinate system; and (f) causing the distal end of the welding torch to aim at the position which is obtained by rotating said detected point by an angle corresponding to said incremental amount about the origin of said work coordinate system.

6. A method of controlling a robot to weld a rotating object, comprising:

(a) obtaining the shape of the rotating object from at least three points about the circumference of a circle corresponding to said object;

(b) welding the object while rotating the object at a predetermined speed;

(c) detecting position data about the circumference of the circle during step (b); and (d) performing weld line tracking from the detected position data during a predetermined period, the shape of the rotating object obtained in step (a), and the predetermined rotating speed.

* * * * *